US009087010B2

(12) United States Patent
Anglin et al.

(10) Patent No.: US 9,087,010 B2
(45) Date of Patent: *Jul. 21, 2015

(54) DATA SELECTION FOR MOVEMENT FROM A SOURCE TO A TARGET

(75) Inventors: Matthew J. Anglin, Tucson, AZ (US); David M. Cannon, Tucson, AZ (US); Colin S. Dawson, Tucson, AZ (US); Robert S. Elder, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 368 days.

This patent is subject to a terminal disclaimer.

(21) Appl. No.: 13/327,571

(22) Filed: Dec. 15, 2011

(65) Prior Publication Data
US 2013/0159645 A1    Jun. 20, 2013

(51) Int. Cl.
*G06F 17/00* (2006.01)
*G06F 11/14* (2006.01)

(52) U.S. Cl.
CPC .................. *G06F 11/1453* (2013.01)

(58) Field of Classification Search
CPC ................ G06F 17/30079; G06F 17/30082; G06F 17/30091; G06F 3/0643; G06F 17/30156; G06F 3/0641; G06F 17/30159; G06F 11/1453
USPC ............................. 707/661, 662, 610; 711/165
See application file for complete search history.

(56) References Cited

U.S. PATENT DOCUMENTS

| 7,404,039 | B2 * | 7/2008 | Smith ........................... 711/117 |
| 7,765,369 | B1 * | 7/2010 | Prahlad et al. ................. 711/159 |
| 7,831,793 | B2 | 11/2010 | Chakravarty et al. |
| 7,908,436 | B1 | 3/2011 | Srinivasan et al. |
| 7,917,551 | B2 * | 3/2011 | Chikusa et al. ............... 707/821 |

(Continued)

FOREIGN PATENT DOCUMENTS

| CN | 1581100 | 2/2005 |
| CN | 101393532 | 3/2009 |
| WO | 2011116087 | 9/2011 |

OTHER PUBLICATIONS

Wikipedia, "Hash Function", (online), Retrieved from the Internet at URL >http.//en.wikipedia.org/wki/Hash_function, modified Aug. 8, 2011, pp. 1-5.

(Continued)

*Primary Examiner* — Thanh-Ha Dang
(74) *Attorney, Agent, or Firm* — William K. Konrad; Konrad, Raynes, Davda and Victor LLP

(57) ABSTRACT

In one aspect of the present description, in connection with storing a first deduplicated data object in a primary storage pool, described operations include determining the duration of time that the first data object has resided in the primary storage pool, and comparing the determined duration of time to a predetermined time interval. In addition, described operations include, after the determined duration of time meets or exceeds the predetermined time interval, determining if the first data object has an extent referenced by another data object, and determining whether to move the first data object from the primary storage pool to a secondary storage pool as a function of whether the first data object has an extent referenced by another data object after the determined duration of time meets or exceeds the predetermined time interval. Other features and aspects may be realized, depending upon the particular application.

19 Claims, 10 Drawing Sheets

(56) References Cited

U.S. PATENT DOCUMENTS

| | | | |
|---|---|---|---|
| 8,452,739 B2 | 5/2013 | Jain et al. | |
| 2003/0217119 A1* | 11/2003 | Raman et al. | 709/219 |
| 2004/0054656 A1* | 3/2004 | Leung et al. | 707/1 |
| 2007/0043734 A1* | 2/2007 | Cannon et al. | 707/10 |
| 2007/0156989 A1* | 7/2007 | Man et al. | 711/165 |
| 2008/0243878 A1 | 10/2008 | de Spiegeleer et al. | |
| 2009/0132619 A1* | 5/2009 | Arakawa et al. | 707/205 |
| 2009/0150639 A1* | 6/2009 | Ohata | 711/172 |
| 2010/0185829 A1* | 7/2010 | Dudgeon et al. | 711/171 |
| 2011/0167096 A1 | 7/2011 | Guo et al. | |
| 2011/0231374 A1 | 9/2011 | Jain et al. | |
| 2011/0282835 A1* | 11/2011 | Cannon et al. | 707/622 |
| 2012/0023292 A1* | 1/2012 | Saito et al. | 711/114 |
| 2012/0158709 A1* | 6/2012 | Gaonkar et al. | 707/723 |
| 2012/0173839 A1* | 7/2012 | Yamamoto et al. | 711/171 |
| 2013/0159645 A1 | 6/2013 | Anglin et al. | |
| 2013/0159648 A1 | 6/2013 | Anglin et al. | |
| 2013/0232126 A1 | 9/2013 | Jain et al. | |

OTHER PUBLICATIONS

U.S. Appl. No. 13/484,119, filed May 30, 2012, entitled, "Data Selection for Movement From a Source to a Target", invented by Matthew J. Anglin et al., pp. 1-56.

Preliminary Amendment dated May 30, 2012, for U.S. Appl. No. 13/484,119, filed May 30, 2012, invented by Matthew J. Anglin et al., pp. 1-8.

Notice of Allowance, dated Jul. 9, 2014 for U.S. Appl. No. 13/484,119, filed May 30, 2012, invented by Matthew J. Anglin et al., Total 15 pages.

International Search Report and Written Opinion, dated Apr. 25, 2014, for International Application No. PCT/IB2012/056934, filed Dec. 4, 2012, Total 8 pages.

English Translation for Application CN1581100A, filed Jul. 31, 2003, invented by Kun Niu et al., Total 10 pages.

Notice of Allowance, dated Oct. 24, 2014, for U.S. Appl. No. 13/484,119, filed May 30, 2012, invented by Matthew J. Anglin et al., Total 13 pgs.

Publication 20130159645 is the English Counterpart to CN2012861504.

Publication 20130159648 is the English Counterpart to CN2012861504.

Notice of Allowance, dated Mar. 13, 2015, for U.S. Appl. No. 13/484,119, filed May 30, 2012, invented by Matthew J. Anglin et al., Total 11 pages.

* cited by examiner

DATA SELECTION FOR MOVEMENT FROM A SOURCE TO A TARGET

BACKGROUND

1. Field

The present description relates to a computer program product, system, and method for backing up data including selecting data for movement from a source to a target.

2. Description of Related Art

There are various known techniques for backing up data. These backup techniques are often implemented using a storage-management server which can store data objects such as user files in one or more locations often referred to as storage pools. The storage-management server frequently uses a database for tracking information about the stored objects, including the attributes and locations of the objects in the storage pools.

One backup technique referred to as "deduplication" is a method of reducing storage space used to store data by eliminating redundant data in files sharing common data. In deduplication systems, typically only one unique instance of the data is actually retained on storage media, such as disk or tape, and additional instances of the data in different files or databases may be replaced with a pointer to the unique data copy. Thus, if only a few bytes of a new file being added are different from data in other files, then only the new bytes may be stored for the new file and pointers are included in the added file that reference the common data in other files or databases.

Thus, deduplication provides a method to remove redundant data during a backup operation, thereby reducing required storage and potentially conserving network bandwidth. A deduplication system often operates by dividing a file into a series of chunks, or extents. The deduplication system determines whether any of the chunks are already stored, and then proceeds to only store those non-redundant chunks. Redundancy may be checked with chunks in the file being stored or chunks already stored in the system.

Caches are frequently used to temporarily store data retrieved from storage. Such caches can provide faster access to data which is frequently used or is otherwise anticipated to be needed. There are various known caching algorithms for selecting data for retention in the cache or for flushing from the cache. Such cache techniques include the first in first out (FIFO) technique which can flush the oldest data from cache. Another cache technique is the least recently used (or read) (LRU) technique which can flush the least recently used data from cache.

SUMMARY

In one aspect of the present description, operations are described for managing data storage in a computing system. In one embodiment, operations include storing a first deduplicated data object in a primary storage pool, determining the duration of time that the first data object has resided in the primary storage pool, comparing the determined duration of time to a predetermined time interval, after the determined duration of time meets or exceeds the predetermined time interval, determining if the first data object has an extent referenced by another data object, and determining whether to move the first data object from the primary storage pool to a secondary storage pool as a function of whether the first data object has an extent referenced by another data object after the determined duration of time meets or exceeds the predetermined time interval.

In another aspect, the aforementioned determining whether to move the first data object includes calculating the space occupied by the data object extents not referenced by another data object after the determined duration of time meets or exceeds the predetermined time interval.

In yet another aspect, further operations are described comprising moving the first data object from the primary storage pool to a secondary storage pool if the calculated space occupied by the data object extents not referenced by another data object, exceeds a threshold.

In still another aspect, further operations are described comprising storing a second deduplicated data object in a primary storage pool, determining the duration of time that the second data object has resided in the primary storage pool, comparing the determined duration of time for the second data object to a predetermined time interval, after the determined duration of time for the second data object meets or exceeds the predetermined time interval, determining if the second data object has an extent referenced by another data object, and determining whether to move the second data object from the primary storage pool to a secondary storage pool as a function of whether the second data object has an extent referenced by another data object after the determined duration of time meets or exceeds the predetermined time interval.

In another aspect, the aforementioned determining whether to move the second data object includes calculating the space occupied by the data object extents of the second data object not referenced by another data object after the determined duration of time meets or exceeds the predetermined time interval.

In still another aspect, further operations are described comprising moving the first data object from the primary storage pool to a secondary storage pool if the calculated space occupied by the data object extents of the first data object not referenced by another data object, exceeds the calculated space occupied by the data object extents of the second data object not referenced by another data object.

In still another aspect, further operations are described comprising storing a first volume containing deduplicated data objects in a primary storage pool, for each data object of the first volume: determining the duration of time that a data object of the first volume has resided in the primary storage pool, comparing the duration of time determined for the data object of the first volume to a predetermined time interval, and after the duration of time determined for the data object of the first volume meets or exceeds the predetermined time interval, calculating for each extent of the data object of the first volume not referenced by another data object, the space occupied by the data object extents not referenced by another data object and calculating the available space of the first volume, and determining whether to move the data objects of the first volume from the primary storage pool to a secondary storage pool as a function of the calculated space occupied and the calculated available space.

In another aspect, the aforementioned predetermined time interval for each data object of the first volume is determined as a function of at least one of a time interval between backup events at a client station, propagation time of duplicate data between client stations, and backup processing time for a data object stored in the primary storage pool.

In another aspect, further operations are described comprising: storing a second volume containing deduplicated data objects in a primary storage pool, for each data object of the second volume: determining the duration of time that a data object of the second volume has resided in the primary storage pool, comparing the duration of time determined for the data object of the second volume to a predetermined time interval, and after the duration of time determined for the data object of the second volume meets or exceeds the predetermined time interval, calculating for each extent of the data object of the second volume not referenced by another data object, the space occupied by the data object extents not referenced by another data object and calculating the available space of the second volume, and determining whether to move the data objects of the second volume from the primary storage pool to a secondary storage pool as a function of the calculated space occupied and the calculated available space.

In a further aspect, the aforementioned determining whether to move the data objects of the second volume includes calculating the space occupied by the data object extents of the second volume not referenced by another data object after the determined duration of time meets or exceeds the predetermined time interval.

In another aspect, further operations are described comprising moving the data objects of the first volume from the primary storage pool to a secondary storage pool if the calculated space occupied by the data object extents of the first volume not referenced by another data object, exceeds the calculated space occupied by the data object extents of the second volume not referenced by another data object.

Other features and aspects may be realized, depending upon the particular application.

DETAILED DESCRIPTION

Figure 1:
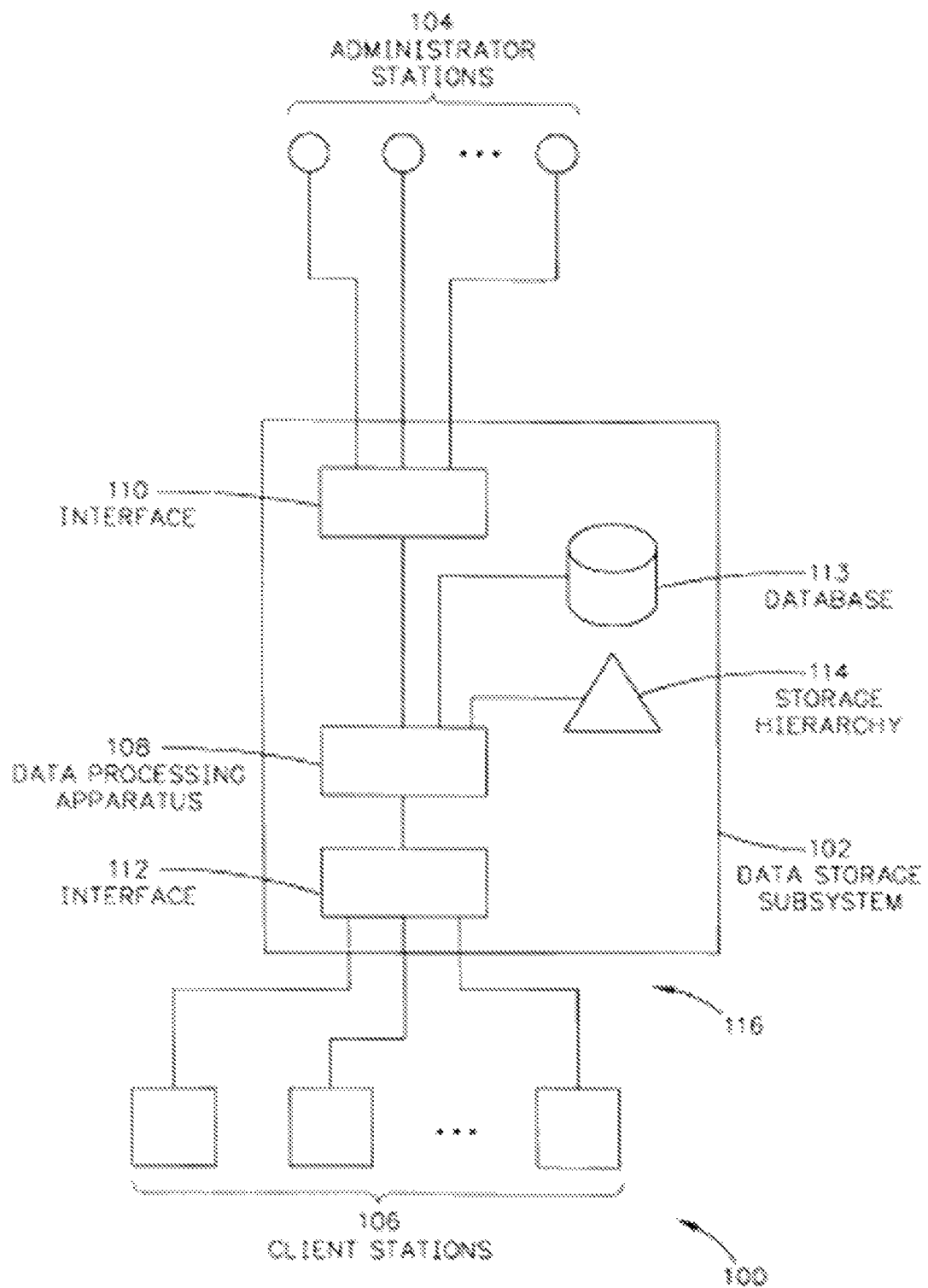
FIG. 1 illustrates an example of a computing environment in which aspects of the illustrated embodiments may be implemented.

Described embodiments provide for backing up data. As used herein, the term "back up" applies to data storing operations performed by a data management system, including archiving, migrating, replicating and deduplicating data as well as copying data to protect against data loss. In one embodiment, this description is directed to selecting data for movement from a source to a target.

In one feature of the present description, a determination of whether to move a first data object from a primary storage pool to a secondary storage pool may be made as a function of whether the first data object has an extent referenced by another data object after the first data object has resided in the primary storage pool for a duration of time which meets or exceeds a predetermined time interval. As another example, a determination of whether to move the first data object from the primary storage pool to a secondary storage pool instead of a second data object, may be made as a function of the total size of extents which are not referenced by another data object after determined durations of time for the first and second data objects meet or exceed a predetermined time interval. Other selection criteria may be used, depending upon the particular application.

As explained in greater detail below, selection of data for movement from a source to a target in accordance with described embodiments, can improve efficiency of back up operations in some embodiments. For example, unnecessary network traffic may be reduced or eliminated. Other features may be realized in addition thereto or instead of, depending upon the particular application.

In a typical configuration, a disk-based storage system, such as a storage-management server, has the capability to divide a file (or other data object such as a database) A into extents a-h, detect that extents b and e are redundant, and only store the unique extents. The redundancy could occur within data object A or with other data objects stored in the storage system.

Typically, the object is divided into extents using a method such as Rabin fingerprinting. Redundant extents may be detected using a hash function such as MD5 or SHA-1 to produce a hash value for each extent and then comparing that value against values for extents already stored on the system.

Typically the hash values for stored extents are maintained in an index, such as a database. If a redundant extent is identified, that extent can be replaced with a pointer to the matching extent, constituting a reference to that extent. In a client-server software system, deduplication during backup can be performed at the source (client), at the target (server), or on a deduplication appliance connected to the server. Additionally, deduplicated data can be replicated between multiple servers such that the source server sends data extents to the target server only if those extents are not already resident at the target.

Data objects and their deduplicated extents may be stored in the disk or other storage subsystem as individual files in a filesystem. Alternatively, many data objects and extents may be stored together as a collection in a larger file residing in a filesystem. For example, a collection of data objects and their extents may be referred to as a "volume".

Various other techniques have been applied or proposed to increase operational efficiency. For example, storage pools for sequential-access media such as magnetic tape can be configured for "collocation" which causes the storage-management server to group data for the same client node on the same tape or tapes. Also, small objects on the storage-management server can be aggregated together into a single entity as they are received by the storage-management server. U.S. Pat. No. 6,098,074 describes an aggregation technique in which objects being stored are aggregated into a "managed file." The objects may thereafter be tracked and moved as a single managed file within the storage hierarchy. When appropriate, individual objects can be processed individually such as for deletion or retrieval operations.

Data replication is used to replicate data in one server backing up data from multiple client nodes to another server, so that if the main source server to which data is being backed-up goes down, the clients can recover their data from the replication site. A storage-management server such as Tivoli® Storage Manager (TSM) stores data objects in one or more storage pools and uses a database for tracking metadata about the stored objects. (Tivoli is a trademark of International Business Machines Corporation worldwide). The storage management server may replicate the data objects to a remote location for disaster recovery purposes. Some of the methods used to migrate data to a remote location include physically transporting tapes containing copies of the data from the source site to the disaster recovery site, electronically transmitting the data (TSM export/import) or using hardware replication of the source site disk storage to create a mirror of the data. Available replication hardware devices include Virtual Tape Library (VTL) products that perform block-level replication using deduplication hardware.

Also, data in a storage-management system such as a backup server can be stored in a storage pool hierarchy which allows data to be stored on a range of devices having varying Characteristics such as cost and performance. Certain policies for managing data can be applied at the storage pool level to determine the appropriate device upon which objects are to be stored. For example, an upper level in the hierarchy (which may be referred to as a primary storage or primary pool) might be comprised of disk media whose data is deduplicated. A lower level in the hierarchy (which may be referred to as secondary storage) could comprise slower, less-expensive storage such as magnetic tape.

After being stored on the storage-management server, data objects can be moved and copied using data-transfer operations such as migration in which objects are moved from one storage pool to another storage pool. For example, an object may be migrated from relatively fast and expensive storage such as a disk to relatively slow and inexpensive storage such as tape. Additional data transfer operations include storage pool backups in which objects in one storage pool are duplicated or copied to another pool for availability and recovery purposes.

In the following description, reference is made to the accompanying drawings which form a part hereof and which illustrate several embodiments. It is understood that other embodiments may be utilized and structural and operational changes may be made without departing from the scope of the present invention.

One aspect of the description provided herein concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file.

Each client station 106 may comprise any general purpose computer, such as a Power Systems workstation, Intel-processor based personal computer, mainframe computer, etc. The client stations 106 may comprise similar or different machines, running the similar or different operating systems. Some exemplary operating systems include AIX™, UNIX, Windows™, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, Storage Area Network (SAN), Local Area Network (LAN), Intranet, the Internet, Wide Area Network (WAN), etc. Preferably, a high speed communication channel such as a T3 link is used, employing a network protocol such as TCP/IP.

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

In an exemplary embodiment, the data storage subsystem 102 may comprise a commercially available server such as the Tivoli Storage Manager™ (TSM™) product distributed by IBM, which has been modified to operate in accordance with the descriptions provided herein. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110, 112 may comprise any suitable device for communicating with the implemented embodiment of client station and administrator station. For example, the interfaces 110, 112 may comprise Ethernet cards, small computer system interfaces ("SCSIs"), parallel data ports, serial data ports, telephone modems, fiber optic links, wireless links, etc.

The data processing apparatus 108 is also coupled to a database 113 and a storage hierarchy 114. As discussed in greater detail below, the storage hierarchy 114 is used to store selected individual user files in a nonaggregated collection. In addition, the storage hierarchy is used to store "managed files". Each managed file typically includes multiple constituent user files stored together as an "aggregate" file. However, in some instances, a managed file may be an individual user file (stored as such). The subsystem's storage of user files in nonaggregated and aggregated form may protect these files from loss or corruption on the client's machine, assist the clients by freeing storage space at the client stations, and may also provide management of client data. In this respect, operations of the storage hierarchy 114 may include "archiving", "deduplicating", "replicating" and otherwise "backing up" files of the client stations 106 to the storage hierarchy 114, "retrieving" stored files for the client stations 106, and "restoring" files backed-up on the hierarchy 114.

The database 113 contains information about the files contained in the storage hierarchy 114. For example, as described in U.S. Pat. No. 6,098,074, this information may include the addresses at which managed files are stored in the storage hierarchy 114, various characteristics of the stored data, certain client-specified data management preferences, etc.

Figure 2:
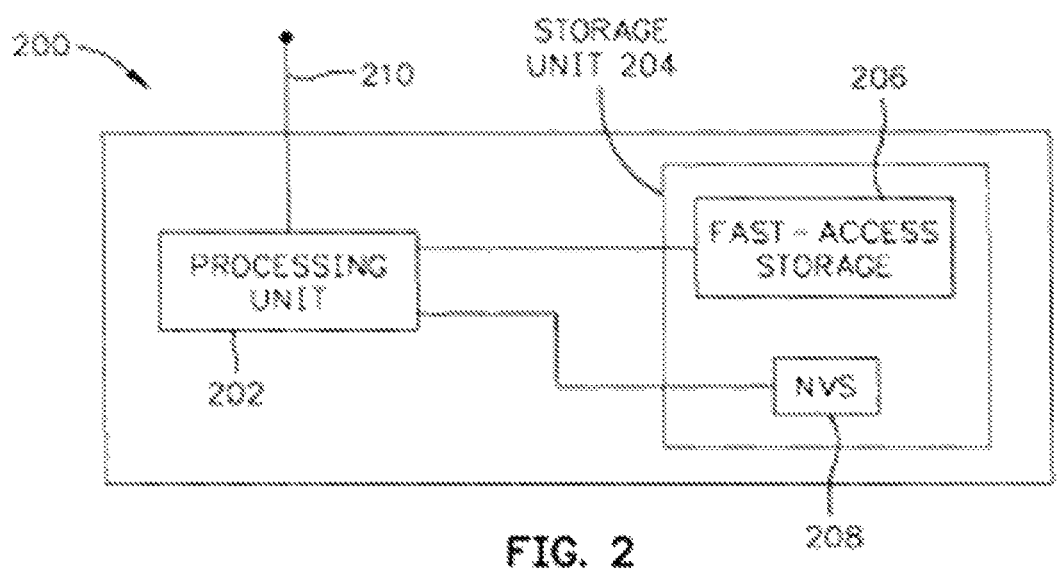
FIG. 2 is a schematic diagram of a digital data processing machine of the embodiment of FIG. 1.
Figure 3:
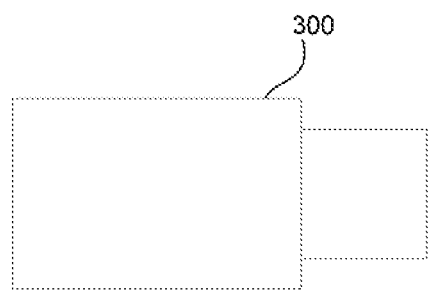
FIG. 3 shows an exemplary signal-bearing medium in accordance with described embodiments.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes one or more storage devices such as a fast-access storage 206 and a nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206 or 208 may be eliminated; furthermore, the storage unit 204 may be provided on-board the processing unit 202, or even provided externally to the apparatus 200.

Figure 4:
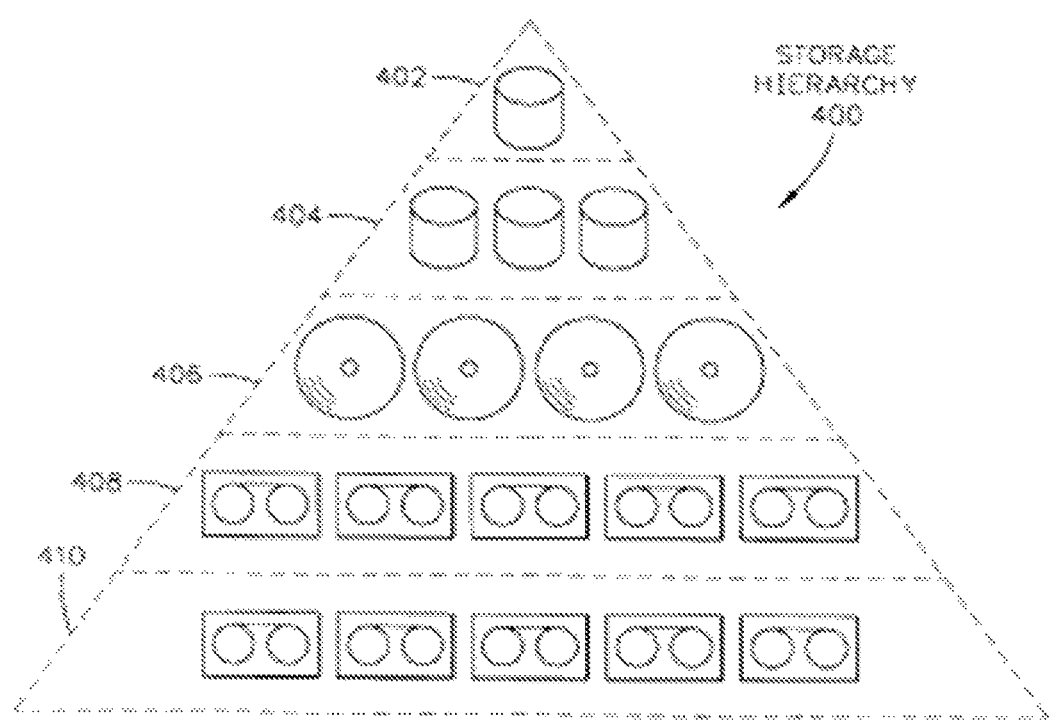
FIG. 4 is a schematic diagram showing the subcomponents of an illustrative storage hierarchy in accordance with described embodiments.

The storage hierarchy 114 may be implemented in storage media of various number and characteristics, depending upon the clients' particular requirements. To specifically illustrate one example, FIG. 4 depicts a representative storage hierarchy 400. The hierarchy 400 includes multiple levels 402-410, where successively higher levels represent incrementally higher storage performance. The levels 402-410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402-410, albeit the most expensive. The second level 404 includes DASDs with less desirable performance characteristics than the level 402, but with lower expense. The third level 406 includes multiple optical disks and one or more optical disk drives. The fourth and fifth levels 408-410 include even less expensive storage means, such as magnetic tape or another sequential access storage device.

The levels 408-410 may be especially suitable for inexpensive, long-term data archival, whereas the levels 402-406 are appropriate for short-term fast access data storage. As an example, one or more devices in the level 402 and/or level 404 may even be implemented to provide a data storage cache.

Devices of the levels 402-410 may be co-located with the subsystem 102, or remotely located, depending upon the user's requirements. Thus, storage devices of the hierarchy 400 may be coupled to the data processing apparatus 108 by a variety of means, such as one or more conductive wires or busses, fiber optic lines, data communication channels, wireless links, interne connections, telephone lines, SCSI connection, ESCON connection, etc.

Although not shown, the hierarchy 400 may be implemented with a single device type, and a corresponding single level. Ordinarily skilled artisans will recognize the "hierarchy" being used illustratively, since the description provided herein includes but does not require a hierarchy of storage device performance.

In the context of the storage hierarchy 114/400, the term "storage pool" is used to identify one or more storage devices with similar performance characteristics. For instance, the level 404 may be comprised of several storage pools, each pool including one or more DASDs.

Figure 5:
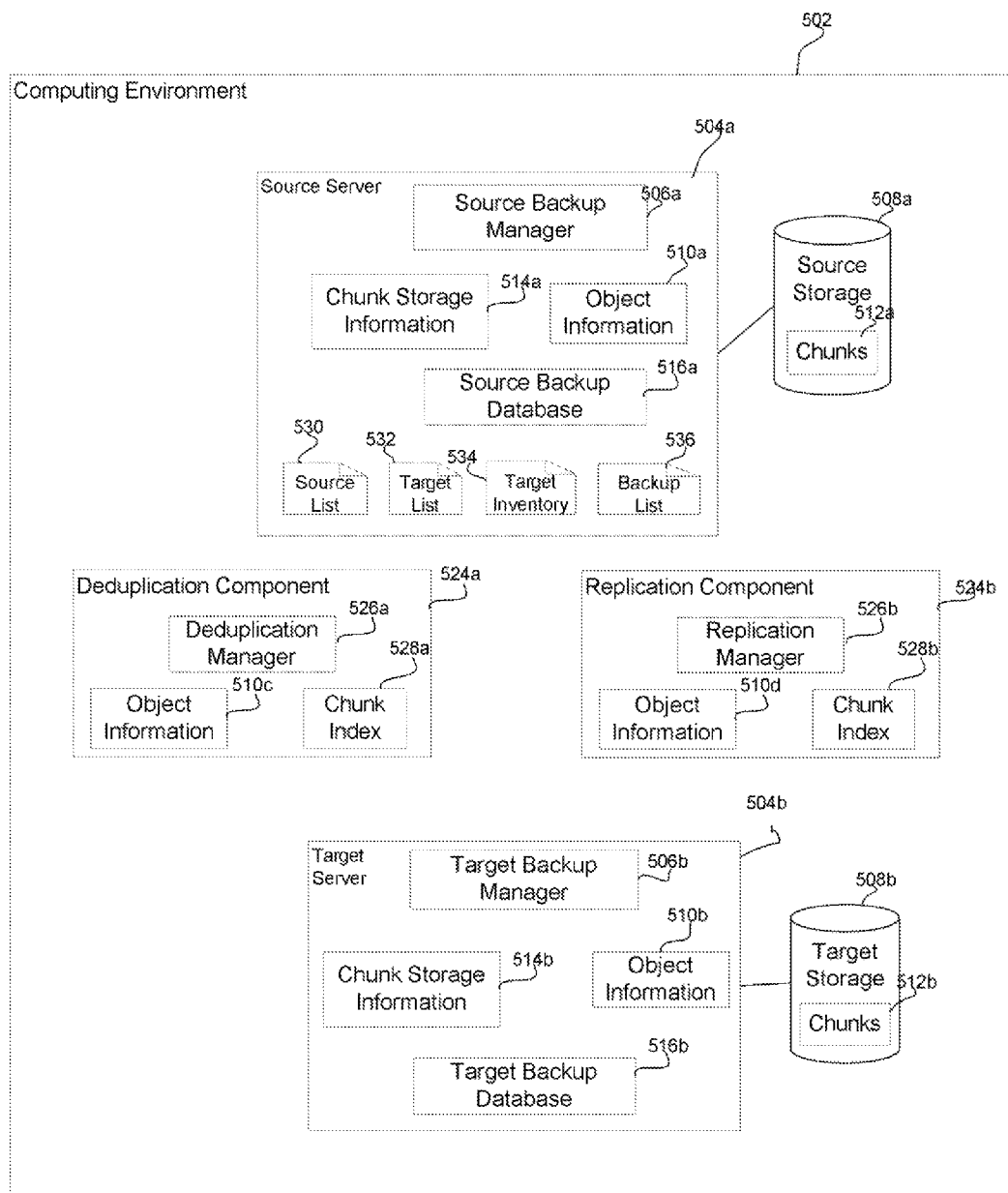
FIG. 5 illustrates another example of a computing environment in which aspects of the illustrated embodiments may be implemented.

FIG. 5 illustrates an embodiment of a computing environment 502 having a source server 504a and target server 504b including a source backup manager 506a and target backup manager 506b, respectively, to back up the data for objects at a source storage 508a to a target storage 508b. Either server 504a, 504b device may function as the source and target server. The backup may be performed on behalf of a client node connected to the source server 504a to back up objects owned by the client node. The source server 504a and target server 504b maintain data objects as defined in the object information 510a and 510b, respectively. The data for the data objects, which may be in the form of separate units of data referred to as extents or chunks 512a, 512b, are maintained in the source storage 508a and target storage 508b, respectively. Each server 504a, 504b maintains chunk storage information 514a, 514b indicating locations in the storage 508a, 508b where chunks of the data objects defined in the object information 510a, 510b are located. The object information 510a, 510b includes metadata or entries for each defined data object, comprised of an ordered list of chunks 512a, 512b of data assigned to each object.

The source server 504a and target server 504b maintain a source backup database 516a and target backup database 516b, respectively, having information on data objects at the source server 504a replicated to the target server 504b on behalf of a client node. The source server 504a further maintains and uses a source list 530 having objects on the source server 504a to back up satisfying a backup criteria, such as owning client node, filespace at the client node, and data type; a target list 532 having objects on the target server 504b satisfying the backup criteria; a target inventory 534 of objects in the target server 504b, including a unique identifier or attribute to uniquely identify the objects; and a backup list 536 of files on the source list 530 not on the target list 532 to back up to the target server 504b. The criteria used to build the target inventory 534 may be broader or the same as the backup criteria.

A deduplication component 524a provides deduplication services for the source 504a and target 504b servers to ensure that when the source server 504a or the target server 504b sends object data that duplicate chunks already present in the receiving server 504a, 504b are not resent. The deduplication component 524a includes a deduplication manager 526a to perform deduplication operations and a chunk index 528a, such as a deduplication index, providing information on chunks 512a, 512b that have been assigned to objects. The deduplication manager 526a ensures that only one copy of each chunk is maintained in the source 508a and target 508b storages when data objects are transferred between the source 504a and target 504b servers, although one chunk in one storage 508a, 508b may be included in multiple data objects defined for the server 504a, 504b managing that storage. The deduplication manager 526a may also maintain object information 510c, having information on the assignment of chunks to objects in the source 504a and target 504b servers.

To perform deduplication, upon having a new or unchanged chunk in a data object, the source backup manager 506a or other component may calculate a hash for the chunk and then communicate the hash for the chunk to the deduplication manager 526a to determine whether the chunk index 528a has a matching hash. If not, the deduplication manager 526a notifies the source backup manager 506a that the chunk is new, and the source backup manager 506a sends a full copy of the new or changed chunk in a data object to the target server 504b to store in the target storage 508b. Otherwise, if the chunk index 528a has a matching copy of the hash, then the source backup manager 506a need not transfer a full copy of the chunk. Instead, the source backup manager 506a may transfer the digest for the chunk and its location in the object. Alternatively, the source backup manager 506a may interact with the deduplication component 524a to determine whether it needs to send a chunk to the target server 504b.

In a client-side deduplication embodiment, the source backup manager 506a, i.e., client, communicates with the deduplication manager 526a to determine whether chunks need to be sent to the target server 504b, so that only new chunks not already indicated in the chunk index 528 as in the target storage 508b are sent to the target server 504b. In a server-side deduplication embodiment, the source server 504a sends all the chunks of a data object to back up to the target server 504b, and the target backup manager 506b requests the deduplication component 524a to determine which chunks are new chunks that need to be stored in the target storage 508b.

In a similar manner, a replication component 524b provides replication services for the source 504a and target 504b servers. The replication component 524b includes a replication manager 526b to perform replication operations and a chunk index 528b, such as a replication index, providing information on chunks 512a, 512b that have been assigned to objects. The replication manager 526b, together with the deduplication manager 526a, ensures that only one copy of each chunk is sent when data objects are transferred between the source 504a and target 504b servers in a replication function. The replication manager 526b may also maintain object information 510d, having information on the assignment of chunks to objects in the source 504a and target 504b servers.

The source server 504a, target server 504b, deduplication component 524a and replication component 524b may be implemented in separate computer devices that communicate over a network, such as a local area network (LAN), storage area network (SAN), wide area network (WAN), etc. In further embodiments, the source server 504a, target 504b, deduplication component 524a and/or replication component 524b may be implemented on one or two computer systems. If the source server 504a, target server 504b, deduplication component 524a and/or replication component 524b are in the same system, then they may communicate over a bus or via memory.

The source 508a and target 508b storages may be configured in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The source backup manager 506a, target backup manager 506b, deduplication manager 526a and replication manager 526b may comprise software programs in a memory executed by a processor. In an alternative embodiment, some portion or all of the programs 506a, 506b, 526a, 526b may be implemented in a hardware component, such as a dedicated integrated circuit, e.g., Application Specific Integrated Circuit (ASIC), expansion card, etc.

Although the source backup manager 506a, target backup manager 506b, deduplication manager 526a, and replication manager 526b are shown as separate components, in alternative implementations the functions performed by these components 506a, 506b, 526a, and 526b may be implemented in a single program component in a single computer system or in more than two program components in more than two computer devices. For instance, the deduplication component 524a may be implemented at the source 504a or the target 504b server, or part of the source backup manager 506a or target backup manager 506b components. The source 506a and target 506b backup managers may be used by client nodes to recover objects as part of a restore operation.

As the primary storage for deduplicated, replicated or other backup data grows and begins to reach full capacity there is often a desire to move data out of a primary pool to secondary storage, making room for new incoming data. For example, in a storage having deduplication, there are various methods which may be used to select which particular deduplicated extents to move out of the primary storage and into secondary storage.

It is recognized herein that various known caching algorithms such as first in first out (FIFO) and least recently used (or read) (LRU) may be utilized for selecting extents to move out of the primary storage and into secondary storage. However, such caching algorithms may not be well suited for use with a deduplicated (or other) pool of extents where the extents may be referenced a number of times, referenced one time, or not referenced at all, for example. Also, caching algorithms may not recognize that the extents which are candidates for migration to secondary storage may be parts of logical data objects.

Thus, if a FIFO (first in, first out) caching algorithm were to be used to select the oldest extents for migration, it is recognized herein that the oldest extents could be highly referenced. As such, it is recognized that the oldest extents may not be good candidates for migration but instead may be more useful remaining on primary storage. Similarly, if the LRU (least recently used) algorithm were to be used to select the least recently used extents for migration, the LRU caching algorithm may not take into account how referenced the extents are.

Thus, another method for selecting extents to move to secondary storage could be to identify the least referenced (LR) extents. In such a selection method, a determination may be made as to how many times extents of a data object are referenced by other logical data objects, and moving those with the least number of external references to secondary storage.

However, in accordance with the present description, it is recognized that the likelihood a given extent will be referenced again is a useful consideration in selecting extents for migration to a secondary storage. For example, it is appropriate to move extents that are less likely to be referenced in the future. In contrast, utilizing an extent selection method which identifies only the least referenced extents may promote storage efficiency of the primary pool in the near term, but may be less efficient in the long run in that it may not determine the likelihood that a given extent will be incrementally referenced again in the future.

In accordance with the present description, it is recognized that when a particular extent first enters the primary pool, if that extent is migrated to secondary storage before the extent is provided a sufficient opportunity to be matched by an extent of another incoming data object, significant space savings may be less likely to be achieved. Accordingly, in one aspect of the present description, extents newly stored in a primary storage may be given adequate time to be matched by other incoming data objects. Such a process for selecting extents, which provides adequate time for the extent to be matched by other incoming data objects before the extent is migrated, may be better suited to storage which practices deduplication. As a consequence, data selection algorithms in accordance with the present description, for moving data objects or volumes of data objects, or portions of data objections or volumes, to secondary storage, may improve the efficiency of the primary pool in terms of the amount of space saved.

In the present description, references are made to how many times a given extent is "referenced." As used herein, a distinction is made between external references and total references which include internal references as well as external references. For example, a given data object may have duplicate data within itself, when data is repeated within the object. Those internal references are not considered herein as external references. Conversely, when a different (that is, an external) data object also references the same extent, the extent is considered herein to have an external reference.

In one embodiment, the data selection method seeks to avoid migrating data which has just been added to the primary storage. To give time for an extent to be matched to future incoming data objects the data selection algorithm can limit migration of data to extents or data objects that have resided in primary storage for a minimum period of time.

In accordance with the present description, a time period for waiting before moving a given data object or set of extents might be determined in accordance with various factors or other considerations. For example, one such consideration may be the time interval between backup events. If data from subsequent backups is expected to be similar to existing backups from the same or different source of the backup data, then time may be allowed for those extents to remain in the primary pool and be matched to data of subsequent backups.

Another consideration for determining an appropriate time period for waiting before moving a given data object or set of extents is the time it typically takes for a given set of data objects to propagate to various machines that store their data in the primary pool. For example, the time it takes a set of emailed data objects to propagate to different machines which are then backed up to the same deduplicated primary pool, may be considered in determining an appropriate time period for waiting before moving a given data object or set of extents. As another example, where software data objects from various machines are backed up to a deduplicated system, the time it takes for a newly available piece of software to be installed on a first machine and then subsequently installed on other machines, may be considered in determining an appropriate time period for waiting before moving a given data object or set of extents.

Still another consideration for determining an appropriate time period for waiting before moving a given data object or set of extents may be the interval of time between the point at which data is initially sent to the primary storage and the subsequent point in time when that data may later be processed. For example, if the data is to be replicated to a remote system, the data should be allowed to remain in the primary pool on the source system until the data has been replicated. Allowing the data to remain in primary storage for at least this interval can improve replication efficiency because the data will be in primary storage on the source system which is typically faster than that of the secondary storage. In addition, the replication process efficiency may be improved by allowing sufficient time in the primary pool for extent processing of the data such that the target system may be sent extents rather than whole data objects, saving network bandwidth. It is appreciated that the interval of time between the point at which data is initially sent to the primary storage and the subsequent point in time when that data may later be processed by other types of backup operations may be considered as well.

It is appreciated that other factors may be considered, depending upon the particular application, for determining an appropriate time period for waiting before moving a given volume, data object or set of extents. Moreover, the durations of the periods of time determined upon consideration of the various factors may vary, depending upon the particular factors or considerations. In one embodiment, the maximum of one or more of the above time periods, if applicable to the particular application, may be used as a minimum time period that extents or data objects should remain in the primary pool before being considered for migration to secondary storage. Thus, this time period may constitute a time threshold that is to be met before data is migrated to secondary storage. It is appreciated that a threshold value may be calculated in other ways, depending upon the particular application. For example, an average value of various time periods determined upon consideration of the various factors applicable to the particular application may be used as the threshold value. Other threshold values may be selected based upon the factor or factors considered to be most pertinent to the particular application.

Data may be moved into and out of storage in a variety of forms. In accordance with the present description, the selection method used to determine which data to move from primary to secondary storage may vary as a function of the data form. For example, one data selection method may be used to determine which data objects to move from primary storage. Furthermore, a different data selection method may be used to determine which volumes of data objects to choose to move to secondary storage, depending on the architecture of the system.

Two separate, but similar, data selection algorithms are described below. One algorithm may be used to select whole data objects for migration from primary to secondary storage. The other may be used to choose which volumes of data objects to move.

In the present description, selection methods are a function of, in addition to a time element, how many times a given extent is "referenced." As set forth above, a distinction may be made between external references and total references which includes internal references as well as external references. Thus, a given data object may have internal references for duplicate data within itself, that is, when data is repeated within the object. Conversely, when a different (that is, an external) data object also references the same extent, the extent is considered herein to have an external reference.

Figure 6:
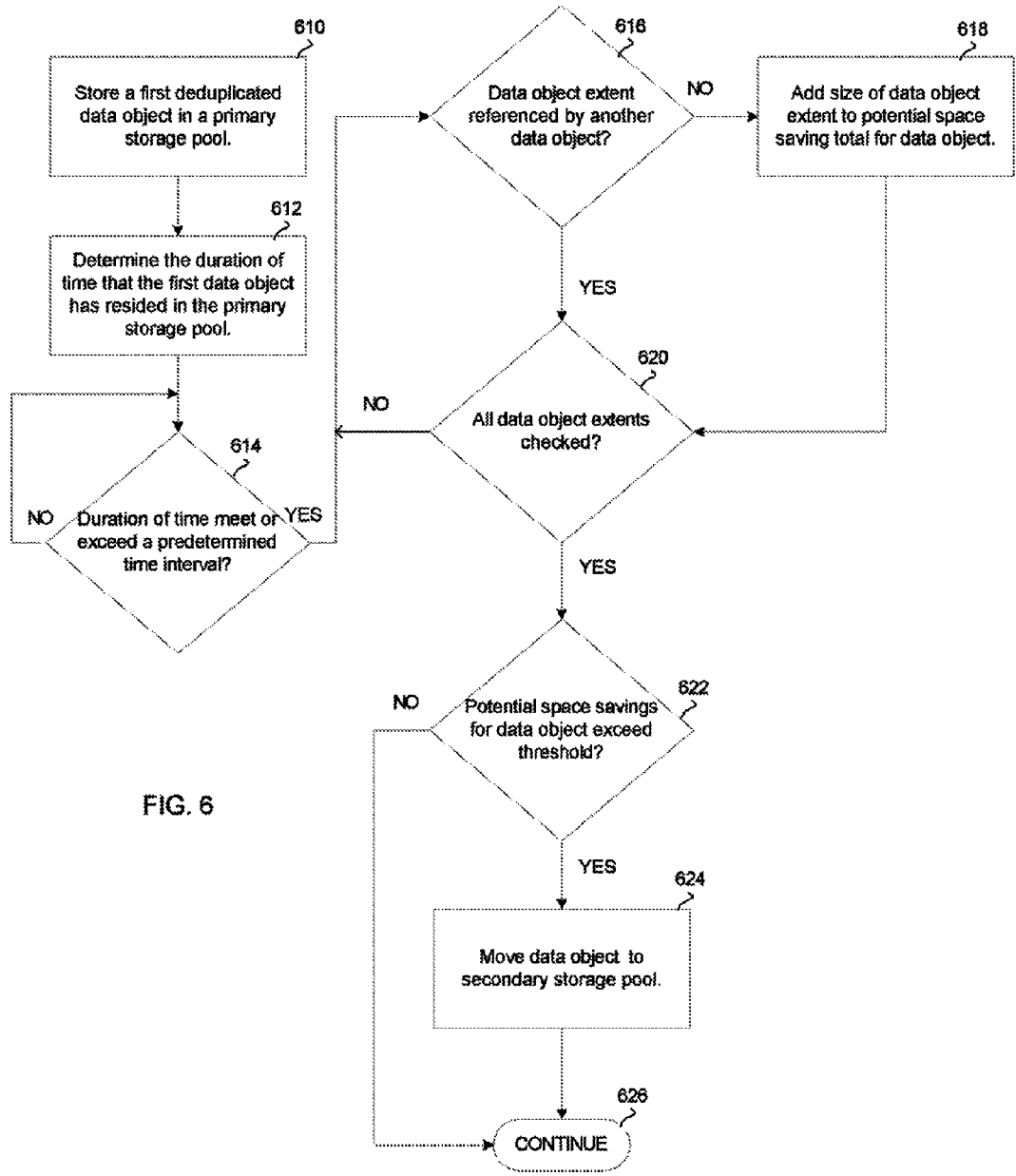
FIGS. 6, 7 illustrate embodiments of operations to select data for movement to a secondary storage.

FIG. 6 depicts one example of operations of a data selection method for choosing which data extents to move from primary storage to secondary storage. In a first operation, a deduplicated data object is stored (block 610) in a primary storage pool. The deduplication system operates by dividing a file into a series of extents. The deduplication system determines whether any of the extents are already stored, and then proceeds to only store those non-redundant extents. Redundancy may be checked with internal extents in the file being stored or external extents already stored in the primary pool.

Redundant extents may be detected using a hash function such as MD5 or SHA-1, for example, to produce a hash value for each extent and then comparing that value against values for extents already stored on the system. Typically the hash values for stored extents are maintained in an index, such as a database in a database system. If a redundant extent is identified, that extent can be replaced with a pointer to the matching extent, constituting a reference to that extent. It is appreciated that data may be deduplicated using other techniques, depending upon the particular application.

In another operation, a determination (block 612) is made as to the duration of time that the first data object has resided in the primary storage pool. In the illustrated embodiment, the database system managing information about the data objects may contain a time stamp of the time each data object was stored in the primary storage pool. The "age" or duration of time that the data object has resided in primary storage pool may be calculated using the timestamp data for that data object and may be compared (block 614) to a threshold.

For each data object in the primary storage where the age of the object (calculated from the object timestamp) is greater (block 614) than the threshold provided, the potential amount of space that would be freed if that object were to be moved to secondary storage may be calculated (blocks 616-620). In the illustrated embodiment, the potential space savings may be calculated as follows:

Space savings=[(for all extents used for a data object)
$\Sigma$((0 if (extent external reference count>=R) else 1)*extent_size)]

wherein R=1, for example.

Thus, for example, a determination is made as to whether a first extent of the data object is referenced (block 616) by another data object (that is, externally referenced). In the expression above, if the extent has at least one external reference, the external reference count is >=1, and the potential space savings subexpression is assigned the value 0 for that extent. As a result, the potential space savings for that extent would be calculated as 0*extent_size or 0 potential space savings in this example.

Conversely, if the first extent of the data object is not referenced (block 616) by another data object (that is, it is not externally referenced), the external reference count is not>=1, and the potential space savings subexpression is assigned the value 1 for that extent. As a result, the potential space savings for that extent would be calculated as 1*extent_size or a potential space savings equal to the size of that extent. Hence, the size of the data object extent is added (block 618) to the cumulative potential space savings total for the data object, in this example.

This procedure is repeated for each extent of the data object. Hence, a determination is made as to whether (block 620) all extents of the data object have been checked. In one embodiment, those objects with the greatest space savings may be moved first. Alternatively, to avoid sorting the result set, a size threshold could be used to only move the data objects that would save a certain amount of space if moved. Hence, in the embodiment of FIG. 6, a determination is made as to whether (block 622) the cumulative potential space savings for the data object exceeds a threshold. If so, the data object is a good candidate for moving and thus, can be moved (block 624) to a secondary storage pool to make room in the primary storage pool. Conversely, if the cumulative potential space savings for the data object does not exceed (block 622) a threshold, the data object may be a poor or less desirable candidate for moving and thus, need not be moved (block 626) to a secondary storage pool to make room in the primary storage pool.

It is appreciated that the value R may be assigned values other than 1. Thus, if the value of R=2, the external reference count would be compared to 2 such that the potential savings calculation would include extents having 1 or fewer external references instead of no external references. Other values and other space savings calculations may be used as well, depending upon the particular application.

Figure 7:
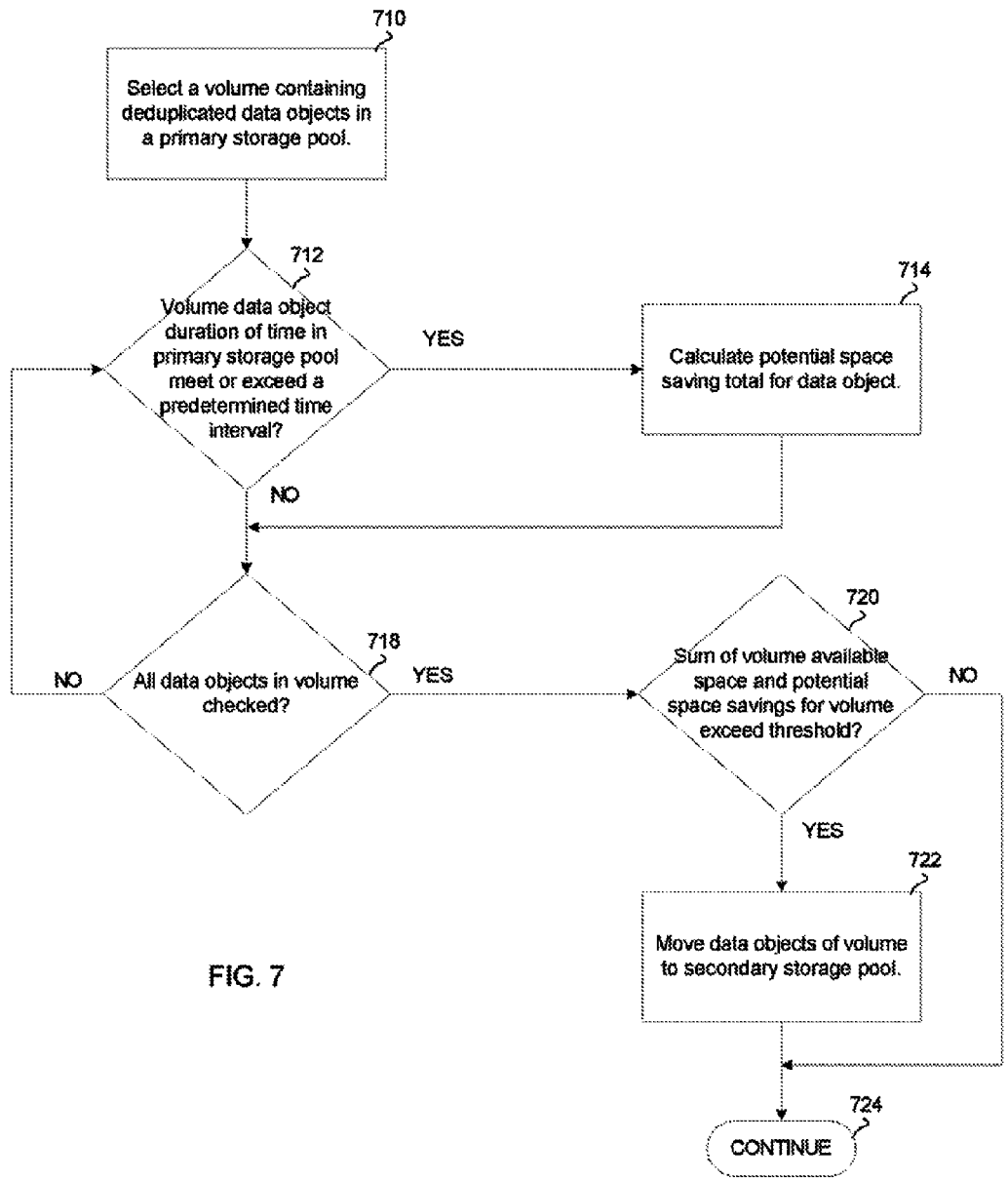

FIG. 7 depicts one example of operations of a data selection method for choosing which volume or volumes of data extents to move from primary storage to secondary storage. In a first operation, a volume containing deduplicated data objects in a storage pool is selected (block 710). A data object of the selected volume is then examined (block 712) to determine whether the duration of time that the data object has resided in the primary storage pool meets or exceed a predetermined threshold value. As noted above, in the illustrated embodiment, the database system managing information about the data objects may contain a time stamp of the time each data object was stored in the primary storage pool. Thus, the "age" or duration of time that the data object of the selected volume has resided in primary spool may be calculated using the timestamp data for that data object and may be compared to a threshold as discussed above in connection with FIG. 6.

For each data object in the selected volume in the primary storage where the age of the object (calculated from the object timestamp) is greater (block 712) than the threshold provided, the potential amount of space that would be freed if that object were to be moved (as part of the selected volume) to secondary storage, may be calculated (block 714) on an extent by extent basis in a manner similar to that described above in connection with blocks 616-620. Thus, in the illustrated embodiment, the potential space savings may be again calculated as follows:

Space savings=[(for all extents used for a data object)
$\Sigma$((0 if (extent external reference count>=R) else 1)*extent_size)]

wherein R=1, for example.

Upon calculation of the potential space savings for each extent of a particular data object, a determination (block 718) is made as to whether the potential space savings calculation has been made for all data objects of the selected volume. If not, the potential space savings for each remaining data object of the selected volume is calculated as discussed above. It is appreciated that other calculations may be used to determine space savings, depending upon the particular application.

Once the potential space savings has been calculated for all data objects of the selected volume, the potential space savings for all the data objects of the volume may be summed (block 720) together to provide a cumulative total which is also summed with the otherwise "available" space in the selected volume. In some volumes, data is not always stored contiguously such that portions of the selected volume may contain storage space which is not being used but is of limited availability to receive new data. For example, the space previously occupied by data deleted from a tape drive volume may not be readily used again in some applications. In this embodiment, such space is referred to herein as otherwise available space which would be freed up if the volume were to be moved to secondary storage.

In one embodiment, the data objects of those volumes with the greatest potential space savings and otherwise available space may be moved first. Alternatively, to avoid sorting the result set, a size threshold could be used to only move the data objects of the volumes that would save a certain amount of space. Such a threshold for volume selection may be expressed as either a percentage of volume size or as total data saved, for example.

In the embodiment of FIG. 7, the sum of the otherwise available space of the selected volume and the cumulative total of the potential space savings calculated for each of the data objects of the selected volume is compared (block 720) to determine if that sum of potential space savings and otherwise available space of the selected volume exceeds (block 720) a threshold. If so, the selected volume may be a good candidate for moving and thus, can be moved (block 722) to a secondary storage pool to make room in the primary storage pool. Conversely, if the sum of the otherwise available space of the selected volume and the cumulative total of the potential space savings calculated for each of the data objects of the selected volume does not exceed (block 720) a threshold, the selected volume may be a poor or less desirable candidate for moving and thus, need not be moved (block 724) to a secondary storage pool to make room in the primary storage pool.

Figure 8:
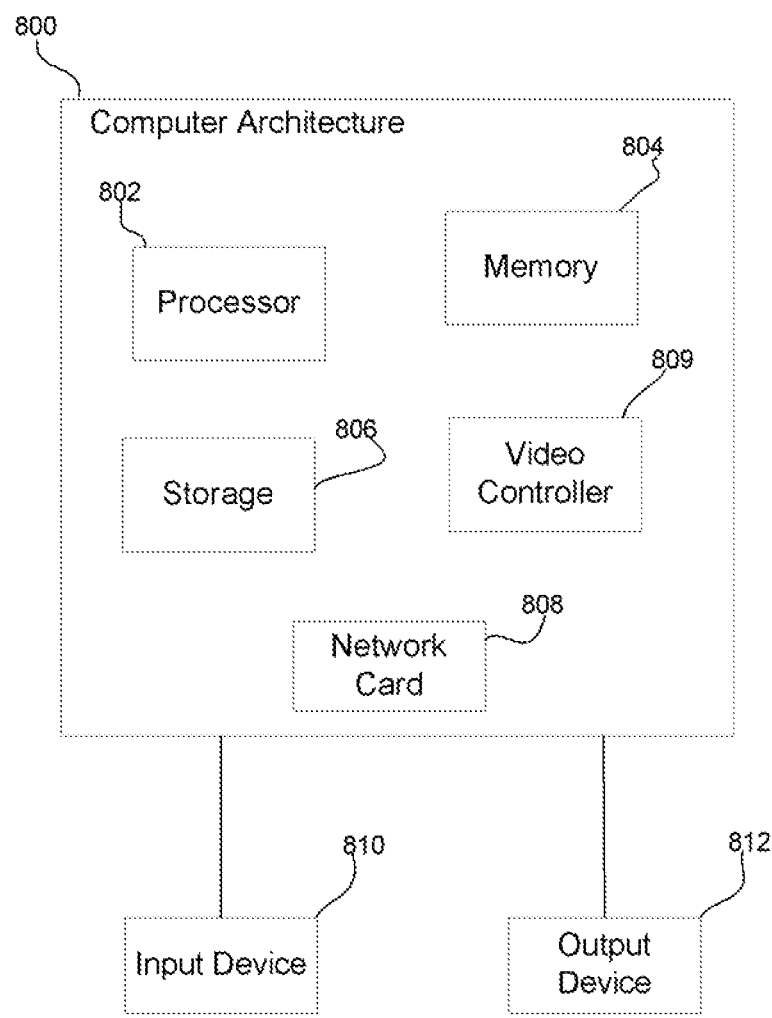
FIG. 8 illustrates another example of a computing environment in which aspects of the illustrated embodiments may be implemented.

FIG. 8 illustrates one implementation of a computer architecture 800 of the network components, such as the data storage subsystem 102, administrator stations 104 or client stations 106 shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. A video controller 809 controls a visual display. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

A data selection method in accordance with the present description, can, depending upon the particular application, improve efficiency of a deduplication, replication or other backup system by keeping the most useful data in the primary pool, and by moving data with less value to secondary storage to make room for additional storage in the primary pool. Thus, for client deduplication systems, for example, where only new extents are sent to the primary pool in the server system, unnecessary network traffic, I/O and index activity may be reduced or eliminated by increasing the probability there will be extent matches in the primary pool. Similarly, by keeping data in the pool for subsequent replication operations, network traffic may be reduced by keeping the data in extented form in the primary pool, sending only new extents to the replication target.

Accordingly, it is believed that a data selection method in accordance with the present description can provide for efficient migration of data from a deduplicated storage pool, or efficient forwarding of extents to a replication target. For example, the use of the quantity of external references to extents of a given data object in combination with the time the extent or data object was stored in a deduplicated primary storage pool, to determine which data is moved from the deduplicated pool to secondary storage, can improve a variety of backup operations including data migration, data deduplication and data replication. In one aspect, the data selection method can consider the data lifecycle so as to maintain the data that more closely suits the environment in the primary pool. Furthermore, the data selection method may be based on references to the extent from multiple deduplicated data objects and the time they have resided in the primary pool, as compared to mere usage of the data.

Cloud Computing Embodiments

The computing environment of FIGS. 1, 8 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 9-11. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
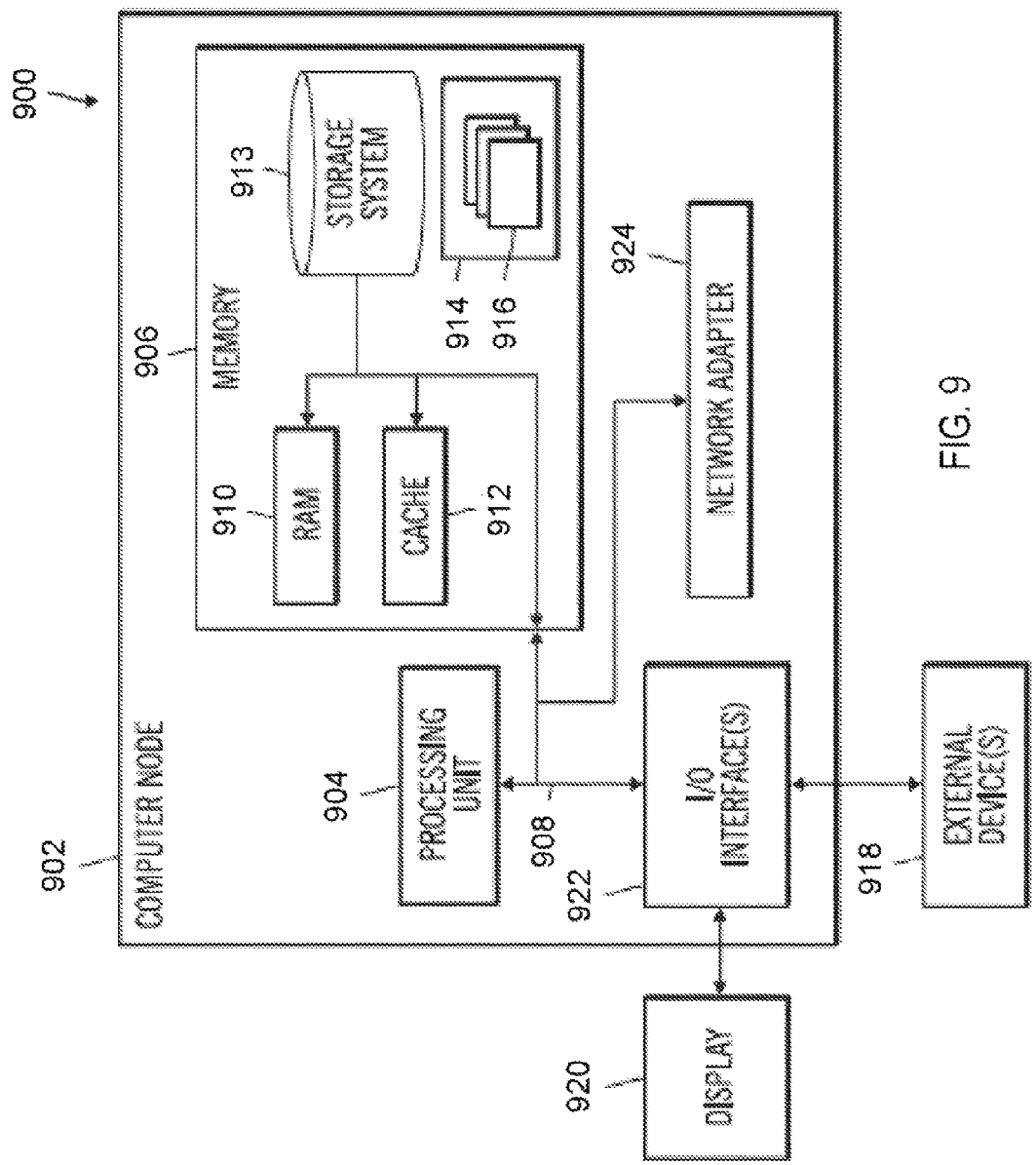
FIG. 9 illustrates an implementation of a node in the network computing embodiment.

FIG. 9 illustrates an embodiment of a cloud computing node 900 which may comprise an implementation of the source server 504a, target server 504b, and deduplication and replication components 524a, 524b, where the components may be implemented in one or more of the nodes 900. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Figure 10:
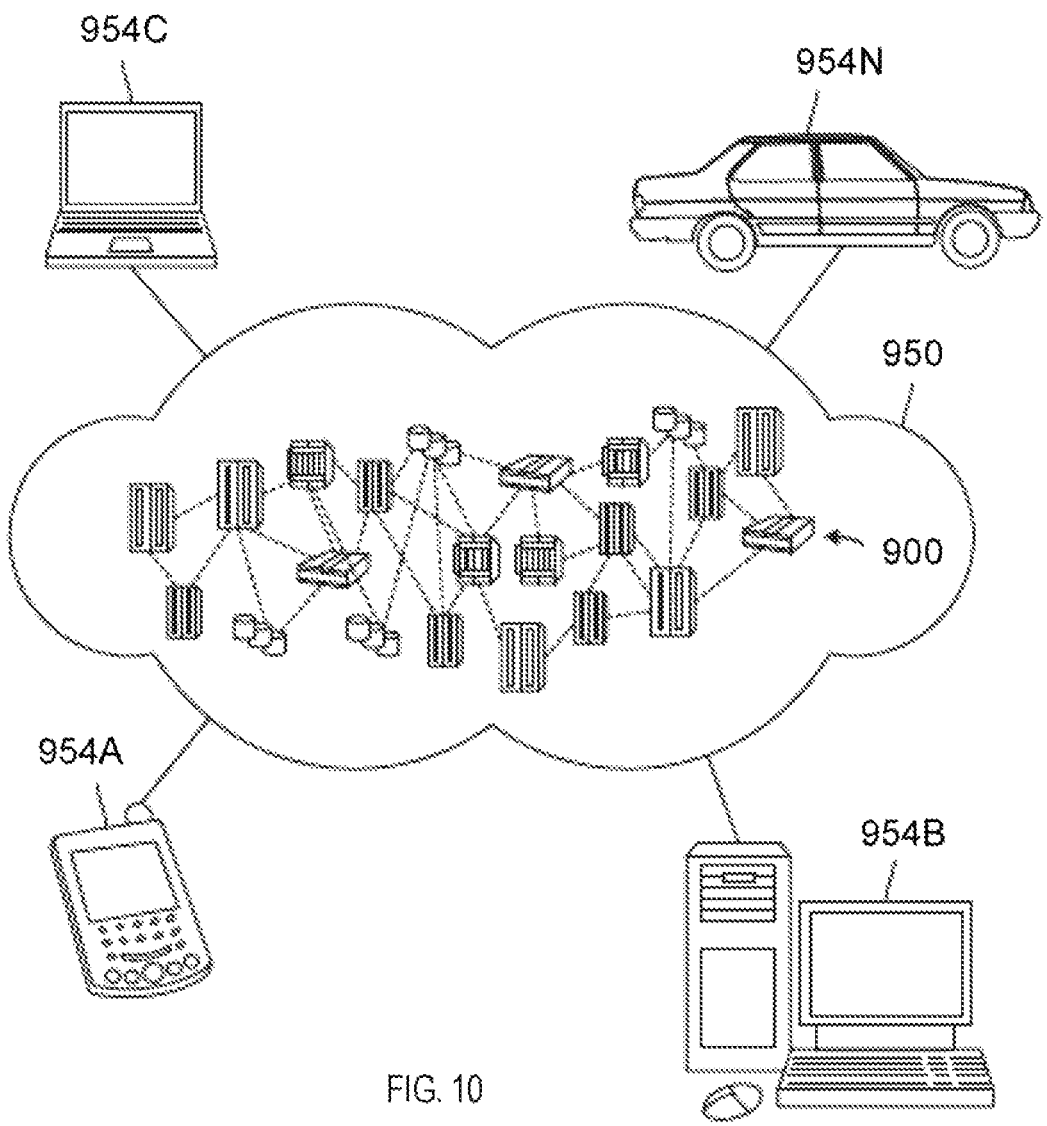
FIG. 10 illustrates an embodiment of a cloud computing environment.

Referring now to FIG. 10, illustrative cloud computing environment 950 is depicted. As shown, cloud computing environment 950 comprises one or more cloud computing nodes 900 with which local computing devices used by cloud consumers, such as, for example, personal digital assistant (PDA) or cellular telephone 954A, desktop computer 954B, laptop computer 954C, and/or automobile computer system 954N may communicate. Nodes 900 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 13 are intended to be illustrative only and that computing nodes 900 and cloud computing environment 950 can communicate with any type of computerized device over any type of network and/or network addressable connection (e.g., using a web browser).

Figure 11:
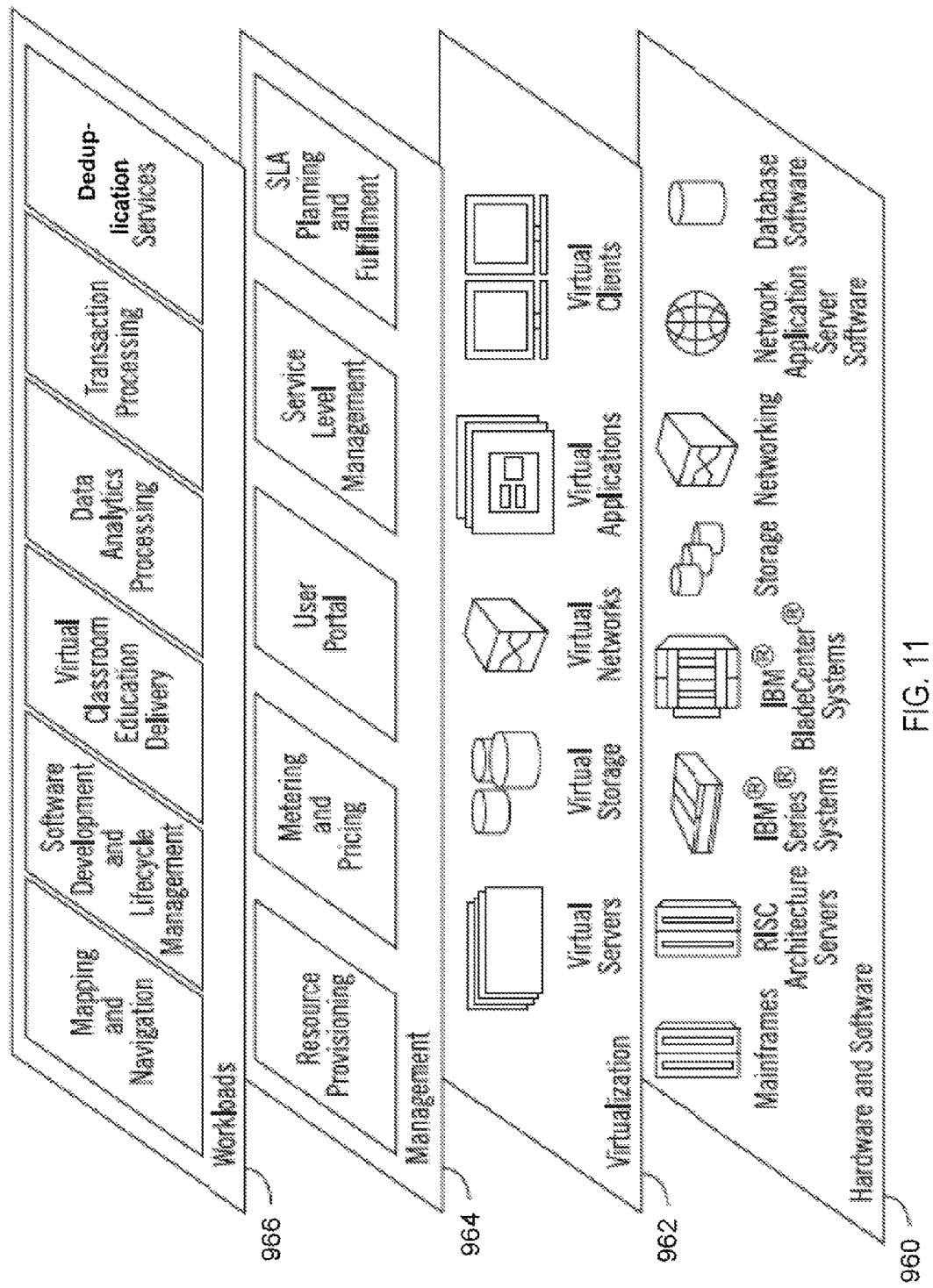
FIG. 11 illustrates an embodiment of abstraction model layers of a cloud computing environment.

Referring now to FIG. 11, a set of functional abstraction layers provided by cloud computing environment 950 (FIG. 12) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual sources.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; deduplication and other backup services, such as described with respect to FIGS. 1-8, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory, such as flash memory 300 of FIG. 3), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data storage having a plurality of storage pools containing extents of data objects, the computer program product comprising a computer readable storage device having computer readable program code embodied therein that executes to perform operations, the operations comprising:
storing a first deduplicated data object in a primary storage pool;
determining the duration of time that the first data object has resided in the primary storage pool;
comparing the determined duration of time to a predetermined time interval;
after the determined duration of time meets or exceeds the predetermined time interval, determining if the first data object has an extent referenced by another data object; and
determining whether to move the first data object from the primary storage pool to a secondary storage pool as a function of whether the first data object has an extent referenced by another data object after the determined duration of time meets or exceeds the predetermined time interval.

2. The computer program product of claim 1 wherein determining whether to move the first data object includes calculating the space occupied by the data object extents not referenced by another data object after the determined duration of time meets or exceeds the predetermined time interval.

3. The computer program product of claim 2 wherein the operations further comprise moving the first data object from the primary storage pool to a secondary storage pool if the calculated space occupied by the data object extents not referenced by another data object, exceeds a threshold.

4. The computer program product of claim 1, wherein the operations further comprise:
storing a second deduplicated data object in a primary storage pool;

determining the duration of time that the second data object has resided in the primary storage pool;

comparing the determined duration of time for the second data object to a predetermined time interval;

after the determined duration of time for the second data object meets or exceeds the predetermined time interval, determining if the second data object has an extent referenced by another data object; and determining whether to move the second data object from the primary storage pool to a secondary storage pool as a function of whether the second data object has an extent referenced by another data object after the determined duration of time meets or exceeds the predetermined time interval.

5. The computer program product of claim 4 wherein the determining whether to move the second data object includes calculating the space occupied by the data object extents of the second data object not referenced by another data object after the determined duration of time meets or exceeds the predetermined time interval.

6. The computer program product of claim 5 wherein the operations further comprise moving the first data object from the primary storage pool to a secondary storage pool if the calculated space occupied by the data object extents of the first data object not referenced by another data object, exceeds the calculated space occupied by the data object extents of the second data object not referenced by another data object.

7. The computer program product of claim 1, wherein the operations further comprise:

storing a first volume containing deduplicated data objects in a primary storage pool;

for each data object of the first volume:

determining the duration of time that the data object of the first volume has resided in the primary storage pool;

comparing the duration of time determined for the data object of the first volume to a predetermined time interval; and after the duration of time determined for the data object of the first volume meets or exceeds the predetermined time interval, calculating for each extent of the data object of the first volume not referenced by another data object, the space occupied by the data object extents not referenced by another data object and calculating the available space of the first volume; and determining whether to move data objects of the volume from the primary storage pool to a secondary storage pool as a function of the calculated space occupied and the calculated available space.

8. The computer program product of claim 7 wherein the predetermined time interval for each data object of the first volume is determined as a function of at least one of a time interval between backup events at a client station, propagation time of duplicate data between client stations, and backup processing time for a data object stored in the primary storage pool.

9. A computing system, comprising:

data storage having a plurality of storage pools containing extents of data objects; and a storage manager including a processor and a computer readable storage device having computer readable program code embodied therein executed by the processor to perform managing operations, the managing operations comprising:

storing a first deduplicated data object in a primary storage pool;

determining the duration of time that the first data object has resided in the primary storage pool;

comparing the determined duration of time to a predetermined time interval;

after the determined duration of time meets or exceeds the predetermined time interval, determining if the first data object has an extent referenced by another data object; and determining whether to move the first data object from the primary storage pool to a secondary storage pool as a function of whether the first data object has an extent referenced by another data object after the determined duration of time meets or exceeds the predetermined time interval.

10. The computing system of claim 9 wherein determining whether to move the first data object includes calculating the space occupied by the data object extents not referenced by another data object after the determined duration of time meets or exceeds the predetermined time interval.

11. The computing system of claim 10 wherein the operations further comprise moving the first data object from the primary storage pool to a secondary storage pool if the calculated space occupied by the data object extents not referenced by another data object, exceeds a threshold.

12. The computing system of claim 10, wherein the operations further comprise:

storing a second deduplicated data object in a primary storage pool;

determining the duration of time that the second data object has resided in the primary storage pool;

comparing the determined duration of time for the second data object to a predetermined time interval;

after the determined duration of time for the second data object meets or exceeds the predetermined time interval, determining if the second data object has an extent referenced by another data object; and determining whether to move the second data object from the primary storage pool to a secondary storage pool as a function of whether the second data object has an extent referenced by another data object after the determined duration of time meets or exceeds the predetermined time interval.

13. The computing system of claim 12 wherein the determining whether to move the second data object includes calculating the space occupied by the data object extents of the second data object not referenced by another data object after the determined duration of time meets or exceeds the predetermined time interval.

14. The computing system of claim 13 wherein the operations further comprise moving the first data object from the primary storage pool to a secondary storage pool if the calculated space occupied by the data object extents of the first data object not referenced by another data object, exceeds the calculated space occupied by the data object extents of the second data object not referenced by another data object.

15. The computing system of claim 9, wherein the operations further comprise:

storing a first volume containing deduplicated data objects in a primary storage pool;

for each data object of the first volume:

determining the duration of time that the data object of the first volume has resided in the primary storage pool;

comparing the duration of time determined for the data object of the first volume to a predetermined time interval; and after the duration of time determined for the data object of the first volume meets or exceeds the predetermined time interval, calculating for each extent of the data object of the first volume not referenced by another data object, the space occupied by the data object extents not referenced by another data object and calculating the available space of the first volume; and determining whether to move the data objects of the first volume from the primary storage pool to a secondary storage pool as a function of the calculated space occupied and the calculated available space.

16. The computing system of claim 15 wherein the predetermined time interval for each data object of the first volume is determined as a function of at least one of a time interval between backup events at a client station, propagation time of duplicate data between client stations, and backup processing time for a data object stored in the primary storage pool.

17. The computing system of claim 15, wherein the operations further comprise:

storing a second volume containing deduplicated data objects in a primary storage pool;

for each data object of the second volume:

determining the duration of time that the data object of the second volume has resided in the primary storage pool;

comparing the duration of time determined for the data object of the second volume to a predetermined time interval; and after the duration of time determined for the data object of the second volume meets or exceeds the predetermined time interval, calculating for each extent of the data object of the second volume not referenced by another data object, the space occupied by the data object extents not referenced by another data object and calculating the available space of the second volume; and determining whether to move the data objects of the second volume from the primary storage pool to a secondary storage pool as a function of the calculated space occupied and the calculated available space.

18. The computing system of claim 17 wherein the determining whether to move the data objects of the second volume includes calculating the space occupied by the data object extents of the second volume not referenced by another data object after the determined duration of time meets or exceeds the predetermined time interval.

19. The computing system of claim 18 further comprising moving the data objects of the first volume from the primary storage pool to a secondary storage pool if the calculated space occupied by the data object extents of the first volume not referenced by another data object, exceeds the calculated space occupied by the data object extents of the second volume not referenced by another data object.

* * * * *